(12) United States Patent
Bertucelli et al.

(10) Patent No.: US 9,399,324 B2
(45) Date of Patent: Jul. 26, 2016

(54) FLAME RESISTANT COMPOSITION, FIBER REINFORCED POLYURETHANE BASED COMPOSITE COMPRISING THE FLAME RESISTANT COMPOSITION AND THE USE THEREOF

(75) Inventors: Luigi Bertucelli, Reggio Emilia (IT); Paolo Diena, Modena (IT)

(73) Assignee: Dow Global Technologies LLC, Midland, MI (US)

( * ) Notice: Subject to any disclaimer, the term of this patent is extended or adjusted under 35 U.S.C. 154(b) by 193 days.

(21) Appl. No.: 14/118,399

(22) PCT Filed: Jun. 25, 2012

(86) PCT No.: PCT/EP2012/062220
§ 371 (c)(1),
(2), (4) Date: Nov. 18, 2013

(87) PCT Pub. No.: WO2013/000860
PCT Pub. Date: Jan. 3, 2013

(65) Prior Publication Data
US 2014/0106637 A1   Apr. 17, 2014

(30) Foreign Application Priority Data
Jun. 29, 2011 (IT) .............................. MI2011A1204

(51) Int. Cl.
| | |
|---|---|
| B29C 70/06 | (2006.01) |
| C08J 5/24 | (2006.01) |
| C08G 18/38 | (2006.01) |
| C08G 18/48 | (2006.01) |
| C08K 7/14 | (2006.01) |
| C08K 3/22 | (2006.01) |
| C08K 3/26 | (2006.01) |
| C08K 5/5353 | (2006.01) |
| B29C 70/46 | (2006.01) |
| B29C 70/12 | (2006.01) |

(52) U.S. Cl.
CPC ................. *B29C 70/06* (2013.01); *B29C 70/12* (2013.01); *B29C 70/46* (2013.01); *C08G 18/381* (2013.01); *C08G 18/3889* (2013.01); *C08G 18/4812* (2013.01); *C08J 5/24* (2013.01); *C08K 3/22* (2013.01); *C08K 3/26* (2013.01); *C08K 5/5353* (2013.01); *C08K 7/14* (2013.01); *C08J 2375/08* (2013.01); *Y10T 428/2933* (2015.01); *Y10T 442/2631* (2015.04)

(58) Field of Classification Search
CPC ........ B29C 70/06; B29C 70/12; B29C 70/46; C08G 18/381; C08G 18/3889; C08G 18/4812; C08J 2375/08; C08J 5/24; C08K 3/22; C08K 3/26; C08K 5/5353; C08K 7/14; Y10T 428/2933; Y10T 442/2631

USPC .......... 524/425, 437, 130; 428/375, 428/304.4–317.1; 442/136; 264/138
See application file for complete search history.

(56) References Cited

U.S. PATENT DOCUMENTS

| | | | |
|---|---|---|---|
| 3,929,688 A * | 12/1975 | Honig | C07F 9/4075 521/108 |
| 4,468,481 A | 8/1984 | Barda et al. | |
| 4,498,482 A | 2/1985 | Williams | |
| 7,655,715 B2 * | 2/2010 | Bauer | C07F 9/301 524/126 |
| 2006/0293400 A1 | 12/2006 | Wiltz, Jr. et al. | |
| 2007/0010979 A1 * | 1/2007 | Wallis | E21B 49/00 703/10 |
| 2007/0110979 A1 | 5/2007 | Clark et al. | |
| 2007/0129452 A1 | 6/2007 | Clatty et al. | |
| 2008/0051481 A1 * | 2/2008 | Krupa | C08G 18/2036 521/131 |
| 2009/0292032 A1 | 11/2009 | Gupta et al. | |
| 2009/0309077 A1 * | 12/2009 | Gupta | C09K 21/14 252/606 |
| 2011/0124760 A1 | 5/2011 | Chen et al. | |
| 2011/0237711 A1 | 9/2011 | Herman et al. | |

FOREIGN PATENT DOCUMENTS

| | | |
|---|---|---|
| CA | 2294277 A1 | 12/1998 |
| JP | 09059509 | 3/1997 |
| WO | 2007075251 A2 | 7/2007 |
| WO | 2008/116610 A1 | 10/2008 |
| WO | 2011/113768 A1 | 9/2011 |

OTHER PUBLICATIONS

Chinese Office Action for CN2012800355489, Issued Dec. 2014, pp. 1-4.
PCT/EP2012/062220, International Search Report/Written Opinion of the International Searching Authority mailed Aug. 9, 2012.
PCT/EP2012/062220, International Preliminary Report on Patentability issued Jan. 7, 2014.

* cited by examiner

*Primary Examiner* — Arti Singh-Pandey

(57) ABSTRACT

The present invention relates to a flame-resistant composition, a fiber-reinforced polyurethane composite comprising the flame-resistant composition and the use thereof. In particular, the invention describes a flame-resistant polyurethane-composite forming composition and a combustion-modified, fiber-reinforced polyurethane composite comprising the flame-resistant polyurethane-composite forming composition, for applications in vehicles and for building products. The invention also describes a long-fiber injection molding process for the preparation of the combustion-modified, fiber-reinforced polyurethane composite. The fiber-reinforced polyurethane composite of the invention show improved fire-reaction behavior, measured as Limiting Oxygen Index (LOI), and a reduced smoke production.

19 Claims, No Drawings

FLAME RESISTANT COMPOSITION, FIBER REINFORCED POLYURETHANE BASED COMPOSITE COMPRISING THE FLAME RESISTANT COMPOSITION AND THE USE THEREOF

The present invention relates to a flame-resistant composition, a fiber-reinforced polyurethane composite comprising the flame-resistant composition and the use thereof. In particular, the invention describes a flame-resistant polyurethane-composite forming composition and a combustion-modified, fiber-reinforced polyurethane composite comprising the flame-resistant polyurethane-composite forming composition, for applications in vehicles and for building products. The invention also describes a long-fiber injection molding process for the preparation of the combustion-modified, fiber-reinforced polyurethane composite above.

The improvement of the characteristics of flame retardant materials is continuously demanded in numerous fields and the urge for materials suitable to prevent or at least to delay the combustion events, meeting fire safety requirements more and more severe, keeps on being strong.

Fiber-reinforced polyurethane (PU) composites made according to the Long-Fiber Injection (LFI) molding process are known for automated manufacturability and for the excellent mechanical properties besides to help styrene-free working environment.

Yet, in general such composites show characteristics and properties which make them unsuitable for some applications, such as, for instance, vehicles components, especially for public transportation (e.g. city-rail interiors) and also for building products (e.g. cladding boards), for which the demand for replacing incumbent unsaturated polyester technology is indeed felt.

Non-generic composite technologies (i.e. non-polyurethane composite technologies) are currently used for "railway car interiors", the expression meaning components such as, for instance, seating, ceilings, floorings, bulkheads, vestibules, wall panels and the like.

Among such technologies, there can be mentioned glass reinforced phenolic prepregs, available from Gurit, featuring good surface finish achieved in short cure cycles (10 minutes at 160° C.) with 63-68% glass loading. The prepregs have been used in interior components aboard the Siemens high speed AVE S103 in Spain and in the exterior front end for the Combino Plus in Portugal. The composites thereby prepared meet these European flame retardant rail specifications: BS 476-6 and 7 Class 1, BS 6853 R. 025 (UK), NF-F 16-101/102 (M1, F1), UNE 23-721 (M1), DIN 5510 S4, SR2, ST2 and DIN EN 455-45.

Fibreglass Reinforced Plastic (FRP) interior components such as wall claddings, window frames, door and seat structures, are also known to be made using SMC 2400—available from Menzolit—, a sheet moulding, glass fibre reinforced, polyester-based compound containing mineral fillers such as up to 350 parts of aluminum trihydrate (ATH). This halogen-free product, used on the Siemens Desiro train and on the Tucheng rail line in China, meets high fire, smoke and toxicity (FST) standards such as British standard BS 6853 level 1b and pr EN 45545 and shows 25% fiber, a low smoke density, non toxic smoke and a Limiting Oxygen Index (LOI) of 70%.

WO 2010/069465 discloses a heat curable composition for fire-resistant or intumescent composite parts, which is free of any halogen additive or halogen structure, which comprises a) a resin including an unsaturated polyester and/or a vinyl ester, b) 40-200 parts by weight of a reactive thinner among ethylenically unsaturated monomers (such as styrene), c) 20-110 parts by weight of a thermal expansion agent (such as melamine, guanidine . . . ), d) 0-250 parts by weight (based on 100 parts by weight of dry resin) of ATH, e) 10-80 parts by weight of a carbonization precursor selected from multifunctional polyols, f) 50-200 parts by weight of at least a phosphorous compound and at least a boric acid derivative. The composition can be used for intumescent composite parts or coatings that comply at least with criterion HL2 of the R1 requirement of prCEN/TS45545-2:2008. Examples show the preparation of composites with approx 20% of glass-mat by use of an unsaturated polyester (UP) resin composition comprising APP, ATH, melamine and pentaerythritol, post cured 4 h at 120° C.

US 2007/0110979 discloses a fiber-reinforced composite fire door and a method of making such door, preferably according to the PU-LFI process. The application discloses a door comprising a first door skin comprising a fiber-reinforced composite and a second door skin disposed opposite the first door skin, the second door skin comprising the fiber-reinforced composite; and a core disposed between the first and second door skins, wherein the fiber-reinforced composite comprises a 5-100 mm fiberglass and a polyurethane resin. Preferably, the composite also comprises a filler, a colouring agent, a fire retardant and at least one of a release agent, a barrier coat, or an in-mold coating.

Yet, at present, also considering that almost every country and often each rolling stock operator has different specifications for fire, smoke, toxicity (FST) performance, which adds to the complexity of supplying materials and cost to the end product, there is still a strong urge for a polyurethane composite capable to meet the severe fire safety requirements for rail applications such as the Chinese standard TB/T 3138-2006, which can also be prepared by an automated, cost-effective and quality consistent process.

It has now been found that such technical problems can be solved by a combustion-modified, fiber-reinforced polyurethane composite comprising a peculiar flame-resistant polyurethane-composite forming composition.

According to a first aspect, the present invention relates to a flame-resistant polyurethane-composite forming composition comprising a curable polyurethane resin, a filler and a fiber, the resin comprising an isocyanate-reactive composition and an isocyanate composition, wherein a) the isocyanate-reactive composition comprises:
    a polyol component comprising at least one polyether polyol having a nominal functionality of at least 2 and a molecular weight of 150 to 1,000, in an amount of at least 10% by weight of the curable polyurethane resin; and
    at least one isocyanate-reactive brominated compound, in an amount of at least 6% by weight of the curable polyurethane resin;

b) the isocyanate composition comprises a polyisocyanate component comprising at least one methane diphenyl-diisocyanate (MDI) and/or polymeric MDI, having a nominal functionality of at least 2, in an amount of at least 20% by weight of the curable polyurethane resin;

c) the filler comprising at least one metal hydrate particulate filler selected from $Al(OH)_3$, $Mg(OH)_2$ and hydromagnesite, in an amount of at least 10% by weight of the flame-resistant polyurethane-composite forming composition; and d) the fiber being selected from glass fiber, carbon fiber, boron fiber, high-melting polymeric fibers and the like, in an amount of at least 20% by weight of the flame-resistant polyurethane-composite forming composition.

The polyether polyol comprised in the isocyanate-reactive composition above defined may be a homopolymer of propylene oxide or of ethylene oxide, a random copolymer of propylene oxide and up to 70% by weight ethylene oxide, or an ethylene oxide-capped poly(propylene oxide) copolymer. The polyether polyol has a nominal functionality of at least 2 and a molecular weight of 150 to 1,000.

As used herein, unless otherwise stated, the functionality refers to the nominal functionality.

Possible mixtures of the polyether polyol above defined, comprised in the polyol component, amount at least to 10% by weight, preferably to 10-20% by weight, of the curable polyurethane resin.

Non-limiting examples of initiators suitable for alkoxylation include, for example, water, ethylene glycol, diethylene glycol and propylene glycol, trimethylolpropane, glycerine, pentaerythritol, sorbitol, sucrose, ethylenediamine, toluenediamines and novolacs.

According to a preferred embodiment, the polyether polyol has at least three hydroxyls, primary amino and/or secondary amino groups per molecule and shows a molecular weight of from 150 to 1000 and an equivalent weight from 50 to 150. Examples of polyols of the type just described include alkoxylates (especially ethoxylates and/or propoxylates) of glycerine, trimethylolpropane, trimethylolethane, pentaerythritol, sorbitol, sucrose, diethanolamine, monoethanolamine, triethanolamine. Most preferred polyols include ethoxylates and propoxylates of glycerine, ethoxylates and propoxylates of trimethylolpropane having an equivalent weight of up to 120, especially up to 100.

It is also possible to include a higher molecular weight polyol in the polyol component. This higher molecular weight polyol may have an equivalent weight of from 161 up to 2000. It preferably has an equivalent weight of from 500 to 1800. This higher molecular weight polyol may contain as few as two and as many as about 8 hydroxyl, primary amino and/or secondary amino groups per molecule. Examples of polyols of this type include polyester polyols, castor oil, the so-called "blown" soybean oil polyols, hydroxymethyl-containing polyols as described in WO 06/0293400 and the like and, preferably, polyether polyols. A polyether polyol of this type may be a homopolymer of propylene oxide or of ethylene oxide, a random copolymer of propylene oxide and up to 70% by weight ethylene oxide, or an ethylene oxide-capped poly(propylene oxide) copolymer. The higher equivalent weight polyol, if present preferably constitutes at most 50%, more preferably from 5 to 35%, and still more preferably from 15 to 35% of the total weight of the polyols in the polyol component. Further preferred polyols include alkoxylates (especially ethoxylates and/or propoxylates) of glycerine, propyleneglycol, sucrose or sorbitol. The polyol formulation may also contain polyesters polyols having two or more hydroxyl groups per molecule, in each case having an equivalent weight as described above. Preferred polyester polyols may be formed in the reaction of a dicarboxylic acid (or anhydride) with ethylene glycol and/or diethylene glycol, possibly in combination with glycerine or trimethylolpropane.

Catalysis for the polymerization of the polyether polyol above defined can be either anionic or cationic, with catalysts such as potassium hydroxide, cesium hydroxide, boron trifluoride, or a double metal cyanide (DMC) complex catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

The isocyanate-reactive brominated compound suitable for the composition of the invention is preferably selected from the group consisting of aromatic or aliphatic brominated alcohols, diols or triols. Examples include tetrabromophtalic anhydride diols, dibromoneopentyl glycol, and tribromoneopentylalcohol (TBNPA) and halogenated aliphatic polyethers diols and triols such as IXOL M125 and IXOL B251 available from Solvay Fluor. Particularly preferred are tetrabromophtalic anhydride diols such as the ones commercially available from Albemarle and Great Lakes, under the trade product names of Saytex RB 79 and PHT-4 respectively. The brominated compound will preferably be used in amounts corresponding to a bromine element content based on the curable polyurethane resin weight, in the range from 2.5 to 8 wt %, most preferably between 3.5 and 6 wt %.

The isocyanate-reactive composition may contain various optional ingredients, including, for instance, a blowing agent, a silicone surfactant, a wetting agent, a reaction catalyst, an internal mold release additive, and the like.

Unless otherwise noted, the weight of any of the possible ingredients of the isocyanate-reactive composition is based on the weight of the curable polyurethane resin excluding any filler(s) and fiber(s).

The blowing agent is preferably water, which reacts with isocyanate groups to release carbon dioxide gas, and/or another compound which generates carbon dioxide under the curing conditions. Examples of such other compounds include certain carbamates and bicarbonate/citric acid mixtures. Water is preferred. It suitably constitutes from 0.25 to 2 weight percent of the isocyanate-reactive composition.

The silicone surfactant may suitably be an organosilicone type. A wide variety of organosilicone surfactants are useful, including those sold by Momentive Performance Materials under the Niax™ trade name or those sold by Evonik under the trade name Tegostab™, or those sold by Air Products under the Dabco™ tradename. Specific examples include Niax™ L-6900, Tegostab™ B 1048 B-8462, B8427, B8433 and B-8404 and Dabco™ DC-193, DC-198, DC-5000, DC-5043 and DC-5098 surfactants. It suitably constitutes up to about 2.5 weight percent of the weight of the isocyanate-reactive composition. A preferred amount is from 0.25 to 1.5 weight percent of the weight of the isocyanate-reactive composition.

A wetting and dispersing agent is a preferred ingredient in the isocyanate-reactive composition, as the presence of the wetting agent can significantly reduce viscosity of the fully formulated polyol component, after the addition of fillers. Suitable wetting agents include certain acidic polyester and ammonium salts of acidic copolymers, such as hydroxyl functional alkylol ammonium salt of an acidic copolymer commercially available from Byk USA under the trade names BYK W985 and BYK W969. Wetting and dispersing agents are generally useful in amounts ranging from about 0.25 to 3, preferably from 0.5 to 2 weight percent of the overall filler weight (i.e. comprising the particulate filler and any possible further filler). It is preferred that the viscosity of the isocyanate-reactive composition, including the overall filler weight, is no greater than 100,000 mPa·s at 23° C. A preferred viscosity is no greater than 50,000 mPa·s at 23° C.

Suitable catalysts which can be incorporated into the isocyanate-reactive composition above defined include tertiary amine compounds and organometallic compounds, especially tin carboxylates and tetravalent tin compounds. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine,4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl)amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino his (propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl) amine, 1,2-ethylene piperidine and methyl-hydroxyethyl piperazine.

Examples of useful tin catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 2 parts by weight per 100 parts by weight of polyol or polyol mixture.

Other isocyanate-reactive compounds may be present in the isocyanate-reactive composition above defined, as well such chain extenders and crosslinkers. Preferred crosslinkers are glycerine, trimethylopropane, diethanolamine and triethanolamine. In the aggregate, the isocyanate-reactive compounds in the isocyanate-reactive composition have an average equivalent weight of from 60 to 200, more preferably from 80 to 160 and still more preferably from 90 to 130 and an average functionality of from 2.5 to 3.2.

Also preferred is the presence of at least one smoke suppressant selected from the group consisting of soluble dibasic esters, particulate carboxylic acids and derivatives, copper oxides, salts and derivatives, and iron oxides, salts and derivatives. The use of above mentioned smoke suppressant additives is described, for example, in U.S. Pat. No. 5,102,919; U.S. Pat. No. 4,076,657; E. D. Weil, S. Levchik, "Iron compounds in Flame Retardancy-results and possibilities"—Proceedings of the Conference on Recent Advances in Flame Retardancy of Polymeric Materials (2003); U.S. Pat. No. 3,637,543; U.S. Pat. No. 3,639,307; U.S. Pat. No. 3,637,542; U.S. Pat. No. 3,746,664; and GB 1325134.

The isocyanate composition, suitable for the flame-resistant polyurethane-composite forming composition of the invention, comprises at least one methane diphenyldiisocyanate (MDI) and/or a polymeric MDI. By "polymeric MDI", it is meant a mixture of MDI with polymethylene polyphenylpolyisocyanates that contain at least three isocyanate groups. A polymeric MDI may have an isocyanate content from 26 to 32% by weight and an isocyanate functionality of at least 2.0, preferably from 2.1 to about 3.0. The MDI may be either the 2,4'- or the 4,4'-isomer, or a mixture of both. The MDI may be modified with carbodiimide, uretonimine or biuret linkages. For example, so-called "liquid MDI" products, which have uretonimine linkages and an isocyanate equivalent weight of about 140-150 can be used as the MDI component.

The MDI and/or polymeric MDI may also be modified to contain urethane groups. This is done by reacting a polyol with an excess of the MDI and/or polymeric MDI. The polyol suitably has an equivalent weight from 31 to 2000, preferably from 60 to 500 and more preferably from 60 to 160, and can contain from 2 to 8, preferably from 2 to 3 hydroxyl groups per molecule. Mixtures of polyols can be used. Examples of suitable polyols for this purpose include ethylene glycol, diethylene glycol, triethylene glycol, propylene glycol, dipropylene glycol, tripropylene glycol, glycerine, trimethylolpropane, trimethylolethane, pentaerythritol, sorbitol, sucrose, alkoxylates (especially ethoxylates and/or propoxylates) of any of the foregoing, and polyesters having an average of at least two, preferably from 2 to 3, hydroxyl groups per molecule.

It is often convenient to introduce urethane groups into only a portion of the MDI and/or polymeric MDI, and to blend the resulting urethane-modified MDI and/or polymeric MDI with additional MDI and/or polymeric MDI. Thus, for example, MDI can be reacted with a polyol to produce a urethane group-containing intermediate, which is then blended with more MDI and/or polymeric MDI. This is a convenient way to prepare a polyisocyanate mixture that contains only a small proportion of urethane-modified molecules.

The polyisocyanate compounds in the isocyanate component preferably have, in the aggregate, an isocyanate content of from 23 to 32 weight percent, preferably from 25 to 32 weight percent, and an average functionality of from 2.3 to 3.0 isocyanate groups per molecule, preferably from 2.5 to 2.8 isocyanate groups per molecule. The isocyanate composition optionally contains an organosilicone surfactant. The surfactant suitably constitutes from 0.25 to 5, preferably from 0.5 to 2.5 percent of the total weight of the isocyanate composition. Suitable surfactants include those described below.

The metal hydrate particulate filler suitable for the composition of the invention is selected from $Al(OH)_3$, $Mg(OH)_2$ and hydromagnesite $(Mg_5(CO_3)_4(OH)_2*4H_2O$, the metal hydrate particulate filler being in an amount of at least 10% by weight based on the total weight of the flame-resistant polyurethane-composite forming composition above defined.

Other fillers may be further incorporated in the flame-resistant polyurethane-composite forming composition above defined. Suitable other fillers are preferably selected among particles made of an inorganic or organic material which is thermally stable (i.e. it does neither undergo physical state change nor engage in chemical reactions) at the processing temperatures encountered during the curing step. Examples of suitable fillers include calcium carbonate, huntite, talc, wollastonite, various clays, ground glass, carbon black, titanium dioxide, iron oxide and the like. Calcium carbonate is preferred.

The metal hydrate particulate and the other fillers possibly present are in the form of particles which preferably have a longest dimension of 50 nm-1 mm. The filler particles more preferably have a longest dimension of 1-500 microns.

The fibers can be of any material that is thermally and chemically stable under the conditions of the curing reaction. Glass fibers are generally preferred on the basis of cost and availability, but boron fibers, carbon fibers, high-melting polymeric fibers and the like are all useful. The fibers may be coated if desired with a sizing, a coupling agent or other useful coating. The suitable weight ratio of fibers to the curable polyurethane resin is such that the flame-resistant polyurethane-composite forming composition above defined contains from about 20% to about 80% by weight of the fibers.

Chopped fibers may also be used, having preferably a fiber length of about 1.25-30 cm (0.5-12 inches). A preferred length for chopped fibers is 2.54 to 10.2 cm (1 to 4 inches). In another embodiment the fiber comprises a fiber glass mat and/or a fiber glass continuous roving.

According to a preferred embodiment, the flame-resistant polyurethane-composite forming composition of the invention further comprises at least one phosphorous-based compound which can be preferably selected among isocyanate-reactive compounds or non-fugitive additives.

Examples of suitable phosphorous-based compounds include any isocyanate-reactive compound such as hydroxylated phosphates and hydroxylated phosphonates, any liquid phosphorous-based additive having low vapour pressure (such as the ones having a vapor pressure at 65° C. below 900 Pa) and any solid phosphorous-containing compound such as ammonium polyphosphates and red phosphorous. Particularly preferred are hydroxylated phosphonates such as N,N-bis-(2-hydroxylethyl)aminomethane phosphonic acid diethyl ester commercially available as LEVAGARD 4090 N from Lanxess; ammonium polyphosphates such as EXOLIT AP422, available from Clariant, and encapsulated red phosphorous such as EXOLIT RP6520 available as a thixotropic paste with castor oil from Clariant.

The amount of the phosphorous-based compound has to be optimized in consideration of the specific flammability requirements, taking into consideration that their presence is effective to improve LOI and flame spread, but may affect the smoke production.

The phosphorous-based compound may be present in an amount corresponding, preferentially, to a content of elemental phosphorous, based on the curable polyurethane resin, of less than 8 wt %, most preferably less than 6 wt %.

According to another aspect, the present invention relates to a combustion-modified, fiber-reinforced polyurethane composite comprising the flame-resistant polyurethane-composite forming composition described above, wherein the composite shows a fire-reaction behaviour measured as Limiting Oxygen Index (LOI) greater than or equal to 35, tested according to GB/T 8924-2005 and a smoke production lower or equal than 200, tested according to GB/T 8323-1987 (or to the equivalent ASTM E662). Both requirements are also part of the specifications of the Chinese standard TB/T 3138-2006 for rail interiors.

The flame-resistant polyurethane-composite forming composition described above cures rapidly on the form or mold to form the combustion-modified, fiber-reinforced polyurethane composite according to the present invention that has good physical, mechanical and reaction-to-fire properties and tends to have good surface appearance.

A further aspect of the present invention is concerned with the use of the above illustrated combustion-modified, fiber-reinforced polyurethane composite, for the preparation of at least a part of a component for motor transport, for building and for power transmission applications.

It is preferred to use the combustion-modified, fiber-reinforced polyurethane composite of the present invention for the preparation of at least a part of a component for rail, sea and air transport and for cladding boards and, in particular for the preparation of at least a part of a component for city-rail interiors.

Also preferably, said at least a part of a component for rail, sea and air transport and for cladding boards is a painted show surface or comprises a decorative foil. The painted show surface is preferably made by using a fire-resistant in-mold or post-painted coating whereas the decorative foil is a thermoplastic skin or a laminated foil.

In another embodiment the invention relates to a long-fiber injection molding process for the preparation of combustion-modified, fiber-reinforced polyurethane composite.

Long-fiber injection (LFI) is a well-known technique for fast-curing two-part polyurethanes in the automotive market. The combustion-modified, fiber-reinforced polyurethane composite of the present invention can be prepared by carrying out a long-fiber injection molding process, providing the curable polyurethane resin components, comprising the reactive polyurethane components, polyol and isocyanate, and the isocyanate-reactive brominated compound, with the metal hydrate particulate filler and the fiber, and optionally with the phosphorous-based compound, to a suitable mixing head, discharging the wetted fibers onto the mold.

The mix-head, mounted on a robot arm, is equipped with a chopper which cuts fibers to length (preferably, chopped glass fiber shows a length of 1.25-10.2 cm), the robot moving the mixing head over the open mold during the pour process. The mold is then closed and the resulting composite is shaped and consolidated under pressure. The resulting composite is then demolded, trimmed and, preferably, taken to a paint-shop for post-painting.

It is preferred to carry out the LFI process by applying a fiber-reinforced layer, dispensing the flame-resistant polyurethane-composite forming composition defined above, over an open mold, then closing the mold so to shape and consolidate under pressure the composite, demolding and then trimming the resulting composite.

In particular, it is preferred to prepare the combustion-modified, fiber-reinforced polyurethane composite of the present invention by a process comprising, before applying the fiber-reinforced layer, the following steps:

(i) applying an external mold release and/or a surface enhancement layer selected from the group consisting of in-mold coatings and decorative foils;

(ii) applying a non-reinforced polyurethane barrier layer to reduce fiber read-through according to a process of sprayed polyurethane barrier layer or poured polyurethane barrier layer.

It is preferred that such non-reinforced PU barrier layer has the same composition of the reinforcement layer.

According to a further preferred embodiment, the process according to the present invention may also comprise a final step of post-painting of the composite.

Besides, the composite of the invention can be advantageously made by other known techniques such as Fiber Composite Spray, Structural Reaction Injection Molding (SRIM), Pultrusion, depending on the desired use thereof, as the skilled man would understand.

As above illustrated, the flame-resistant polyurethane-composite forming composition according to the present invention comprises an isocyanate composition and an isocyanate-reactive composition; the polyol component includes one or more polyol materials as described more fully below. The polyisocyanate component includes an MDI or polymeric MDI. The isocyanate-reactive constituents of the polyol component are selected together with the isocyanate compounds in the polyisocyanate component, and together with the isocyanate index, such that the calculated molecular weight between crosslinks in the cured polymer is from 300 to 600, preferably from 400 to 500. The calculated molecular weight between crosslinks takes into account the functionality (number of isocyanate or isocyanate-reactive groups per molecule) and equivalent weight of the polyisocyanates and isocyanate-reactive materials, together with the isocyanate index, as follows:

$$M_c = \frac{W_{pol} + W_{iso}}{\frac{W_{pol}(F_{pol} - 2)}{E_{pol}XF_{pol}} + \frac{W_{iso,stoic}(F_{iso} - 2)}{E_{iso}XF_{iso}} + \frac{w_{iso,excess}(F_{iso} - 1)}{E_{iso}(F_{iso} + 1)}}$$

where:

$M_c$ is the calculated molecular weight between crosslinks;

$W_{pol}$ is the weight in grams of all isocyanate-reactive materials in the polyol component. $W_{pol}$ includes the weight of water or other isocyanate-reactive blowing agent.

$W_{iso}$ is the weight in grams of all polyisocyanate compounds that are used to prepare the polyisocyanate component.

$F_{pol}$ is the number average functionality (number of isocyanate-reactive groups) per molecule of isocyanate-reactive compounds in the polyol component. Water is included in this calculation and is assumed to have a functionality of two. Nominal functionalities are used for purposes of this calculation.

$E_{pol}$ is the average equivalent weight, per isocyanate-reactive group, of all isocyanate-reactive materials in the polyol component. The calculation of $E_{pol}$ takes into account the water or other isocyanate-reactive blowing agent.

$W_{iso,\ stoic}$ is the weight of the polyisocyanate compounds when the isocyanate index is 100 or less. If the isocyanate index is above 100, $W_{iso,\ stoic}$ is the weight of the polyisocyanate compounds which are needed to provide an isocyanate index of 100, i.e., one equivalent of isocyanate groups per equivalent of isocyanate-reactive groups in the polyol component.

$E_{iso}$ is the average equivalent weight, per isocyanate group, of all polyisocyanate compounds in the polyisocyanate component.

$F_{iso}$ is the number average functionality (number of isocyanate groups per molecule) of polyisocyanate compounds in the polyisocyanate component.

$W_{iso,\ excess}$ is the weight of the polyisocyanate compounds, if any, in excess of that needed to provide an isocyanate index of 100.

As indicated by the foregoing formula, polymer crosslinking forms as a result of the presence of isocyanate-reactive compounds and/or isocyanate compounds that have a functionality of at least than 2, and/or an isocyanate index greater than 100. Most typically, the isocyanate-reactive materials contained in the polyol component will have, in the aggregate, an average functionality of at least 2.0, preferably at least 2.5 and more preferably at least 2.6. The polyisocyanate compounds contained in the isocyanate component typically will have an average isocyanate functionality of at least 2.0, preferably at least 2.3 and more preferably at least 2.5.

According to another preferred embodiment, the composite is made in accordance with the invention by mixing the isocyanate-reactive composition, previously added with the particulate filler, and the polyisocyanate component, to form a filled curable polyurethane resin, wetting fibers with the filled curable polyurethane resin and dispensing the wetted fibers onto a form or into a mold where the resulting curable composition is cured. The fiber reinforcement, such as a mat or continuous rovings, may alternatively be impregnated with the curable composition inside the mold or a die.

In one embodiment, the wetting of fibers and dispensing functions can be performed by bringing the isocyanate-reactive composition, filler, polyisocyanate component and fiber, together and dispensing the resulting curable mixture onto a form or into a mold. The curable mixture wets the fiber in the mixhead or en route to the form or mold surface, so that the fiber is at least partially wetted with the curable mixture before it reaches the surface of the form or mold. In another embodiment the curable composition is poured or injected into a mold where the fiber reinforcement has been previously positioned. In still another embodiment the impregnation takes place in a bath or a die according to the pultrusion process. The polyol and polyisocyanate components are suitably mixed at ratios sufficient to provide an isocyanate index of from about 80 to about 300. A preferred isocyanate index is at least 100 and no greater than 150. An especially preferred isocyanate index is from 100 to 125.

The wetted fibers can be dispensed by pouring or spraying. In a pouring process, the wetted fibers are simply poured or injected onto the surface of the form or mold. In a spraying process, the fibers and the curable composition are sprayed onto the form or mold. In some embodiments, the fibers and the curable composition are sprayed separately but simultaneously, the direction of the sprays being such that the fibers become wetted as they travel toward the mold or form. In these cases, a gas stream can be used to propel the fibers into the filled curable polyurethane resin composition exiting the mixhead. Alternatively, the fibers and the filled curable polyurethane resin can be brought together within a mixhead and sprayed out together. In either case, the fibers become wetted by the filled curable polyurethane resin and then are brought into contact with the form or mold. For these processes, a preferred type of mixhead includes a high pressure impingement mixer, by which the filled polyol and polyisocyanate components are brought into contact and rapidly mixed and brought into contact with the fibers. The fibers can be supplied in the form of continuous rovings which are chopped into the desired lengths immediately before being introduced into the mixhead. Mixheads of these types are commercially available. They include the "LFI" mixheads that are available from Krauss-Maffei.

Once the wetted fibers are applied to the form or mold, the filled curable polyurethane resin is cured to form a polyurethane polymer. It is usually desirable to performing the curing step at an elevated temperature, such as from 50° C. to 120° C. The form or mold together with the applied wetted fibers is in that case heated together to the curing temperature. It is common to preheat the form or mold to the curing temperature. The material is cured on the form or in the mold long enough that it can be demolded without permanent deformation or damage to the part. Both closed-mold curing and open-mold curing are possible. The curing step generally requires from 0.5 to 20 minutes, depending on the particular formulation (including the selection and amount of catalyst) and the curing temperature. If a blowing agent is present in the curable polyurethane resin, the latter will expand during the curing step and form a cellular composite.

The process of the invention is suitable for producing multi-layer structures. It is often desirable to produce parts which have a very smooth and/or colored show surface. This can be done in accordance with the invention by first applying a powder coating, in-mold paint, thermoplastic film and/or gel coating composition to the surface of the form or mold, and then dispensing wetted fibers onto the form or mold as described above. A powder coating, in-mold paint and/or gel coat can be cured simultaneously or sequentially with the curing of the curable composition of the invention, depending on the time allowed to elapse between the application of the various layers onto the form or mold. In a simultaneous cure, curing conditions in this case are selected to permit both layers to cure.

A show surface also can be applied after the filled curable polyurethane resin of this invention is cured, using techniques such as high-pressure injection in-mold coating processes or via common, post-demold painting or coating methods.

It is also possible to introduce additional layers into the multilayer structure, in addition to or in place of the powder coating, in-mold paint, thermoplastic film and/or gel coating. For example, one or more additional layers can be interposed between a show surface layer and the fiber-reinforced polyurethane layer. Alternately or in addition, one or more additional layers can be applied atop the fiber-reinforced polyurethane layer.

A specific multilayer composite of interest includes a show surface which may be a cured powder coating, a cured in-mold paint, a thermoplastic film or a cured gel coating; a substantially non-cellular barrier layer atop the show surface, and a fiber reinforced, optionally cellular, polyurethane layer atop the barrier layer. As before, all layers in any such multilayer structures can be cured simultaneously or sequentially.

The process is suitable for producing parts such as automobile and truck body panels, hulls of boats and personal watercraft, all-terrain vehicle bodies, railcar interiors, golf cart bodies; cladding panels for housings; electronics housings, and the like. The good thermal stability of the fiber-reinforced polyurethane polymer makes the parts useful even in applications in which they will be exposed regularly to temperatures as high as 100° C. Therefore, the parts are also useful in and around engine compartments of vehicles such as personal watercraft, ATVs, automobiles and the like.

It has been found that the flame-resistant polyurethane-composite forming composition of the present invention allows preparing the combustion-modified, fiber-reinforced polyurethane composite described above, substantially devoid of fugitive chemicals, which meets the fire-safety and mechanical properties requirements and shows a good surface quality, as well.

The following examples are provided to illustrate the invention but are not intended to limit the scope thereof. All parts and percentages are by weight unless otherwise indicated.

EXAMPLES

The following materials are used in the following examples:

"VORANOL™ CP 260" is a polyether polyol which is an all PO polyol based on glycerine and PO, 3 functional with a 85 HEW and is available from The Dow Chemical Company; [Glycerine/PO, OH n° 660]

TERGITOL™ L64E [DPG/PO-EO capped (40% EO), OH No.=37] non-ionic EO/PO-based surfactant available from The Dow Chemical Company;

"Glycerine" is glycerol propane 1,2,3 triol having a MW 92 and OH n° 1806;

NIAX™ L6900 is a non-hydrolysable silicone polymer available from Momentive Performance Materials Inc.

SAYTEX™ RB79 or PHT-4 Diol is a flame retardant, a mixed ester of tetrabromophthalic anhydride with diethylene glycol and propylene glycol (% Br=50.9, OH n°=220) available from Albemarle or Great Lakes;

LEVAGARD™ 4090N is N,N-bis-(2-hydroxylethyl)aminomethane phosphonic acid diethyl ester, % P 12.1, OH n°=420-460 mg KOH/g, a flame retardant available from Lanxess BYK™ W 969 is a 2-phenoxyethanol alkylammonium salt of an acidic copolymer, a wetting/dispersing additive available from BYK-Chemie GmbH;

EXOLI™ RP 6520 is a thixotropic blend of castor oil with stabilized, micro encapsulated red phosphorus, OH n° 80, P content 43-48 wt %, available from Clariant;

EXOLIT™ AP422 (APP) is a fine particle ammonium polyphosphate, available from Clariant;

"POLYCAT™ SA1/10" is Diazo-bicyclo undecene (DBU) phenolate, a heat activated gel catalyst available from Air Products;

DABCO™ KTM 60 is a non-acid blocked, controlled-activity tertiary amine, a formulated catalyst, available from Air Products;

MARTINAL™ OL 104 (ATH) is a fine precipitated aluminum trihydrate, available from Albemarle;

VORANATE™ M 220 is a polymeric MDI; NCO=31%; viscosity 200 mPa*s at 25° C., available from The Dow Chemical Company.

Example 1

The samples (formulations 1-9, illustrated in the left half of the following Table 1) were prepared in the laboratory according to the following procedure:

The liquid ingredients (VORANOL™ CP 260, TERGITOL™ L64E, Saytex RB79, glycerine, NIAX™ L6900, Polycat SA1/10 catalyst, Levagard 4090 N and water) of the polyol component were mixed in the amounts shown in Table 1. The solid flame retardants, hydrated metals and/or other fillers (EXOLIT™ RP 6520 and EXOLIT™ AP422, aluminum trihydrate, calcium carbonate) were then added to the resulting mixtures.

The resulting isocyanate-reactive component, including solid particulates, was mixed with the isocyanate component with a mechanical stirrer at 3000 rpm, for 15-20 seconds to form a filled curable polyurethane resin.

To 240 g of said resin, 120 g of chopped fiberglass fibers (i.e. 33 wt % on the total composition, fiber length=25 mm) were added in several steps stirring with a spatula (the thermo-activated catalyst enables long enough open times to allow this preparation procedure).

The resulting flame-resistant polyurethane-composite forming composition was finally poured into a mold at 72° C. (70° C.-75° C.), closing the mold and demolding the resulting samples after 10 minutes.

The molded samples, prepared according the lab hand-mix procedure illustrated above and having a thickness of approximately 3.5 mm, were tested to measure Limiting Oxygen Index (LOI) and smoke density.

LOI, tested according to GB/T 8924-2005, was found to range between 33 and 45. Limited Oxygen Index (LOI) of 35 could be obtained with formulations combining a high amount of brominated diol and a high content of ATH (formulation N° 4). Higher (i.e. better) LOI values were obtained with the incorporation of phosphorous compounds (formulations N° 5, 6, 8). Formulation N° 4 (without phosphorous) was found to concurrently meet requirements of LOI equal or higher than 35 and requirements of low smoke density, according to GB/T 8323-1987 (or the equivalent ASTM E662). Formulations N° 5, 6, 8 that contain phosphorous compounds showed higher (worse) smoke density values.

LOI was tested according to EN ISO 4589-2 (equivalent to ASTM 2863) using a FTA Flammability Unit of Stanton Redcroft.

The Oxygen Index test employs a test specimen bar which is clamped at the base and held vertically in a glass chimney. A known mixture of nitrogen and oxygen is metered into the bottom of the chimney and the specimen is ignited at the top. Tests are run to find the minimum concentration of oxygen required to support flaming combustion of the specimen under the conditions of the test. The sample must burn over at least 50 mm of its length and for at least 180 seconds. Tested specimens have been cut with the actual molded thickness (about 3.5 mm vs. 3.0±0.25 of the standard).

The test method GB/T8323-1987 is basically equivalent to ASTM E662. The test methods expose a vertical specimen to a heat flux of 25 kW/m² provided by a round furnace.

The testing has been carried using a Smoke Density Chamber of Fire Testing Technology, in both flaming and non-flaming conditions.

The following parameters have been measured:
$D_s(n)$—Specific optical density of smoke: optical density in the test chamber multiplied by a factor, which depends on the instrument and on the specimen size; n indicates "at time n minutes into the test"; Ds is dimensionless.
$D_m$, the maximum optical density measured at the end of the test (after 20 minutes), $D_{m\ (corr)}$, the maximum optical density corrected taking into consideration the "clear beam" reading after exhausting the smokes, and $VOF_4$, the cumulative value of specific optical densities in the first 4 min of the test (calculated according to the formula $VOF_4=[Ds(1)+Ds(2)+Ds(3)+Ds(4)]/2$ Example 2

PU LFI moldings were prepared using a Krauss-Maffei RIMSTAR RS1640 LFI Modula machine provided with a mixing head LFI MK 30/36. This machine was equipped in the polyol stream line with a piston dosing unit to enable processing of filled isocyanate-reactive composition. Such composition was prepared first mixing all the liquid components and additives (i.e. Voranol CP260, Tergitol L64E, glycerine, Saytex RB79, water, Byk W969, Niax L6900, Dabco KTM 60, Levagard 4090 N) according to the formulations shown in the following Table 1, (see the right half of said table, formulations A-C), then adding the solid particulates (aluminum trihydrate, EXOLIT RP6520), followed by mixing with a mechanical stirrer for 30 minutes. The so obtained composition was loaded to the polyol component tank. The isocyanate Voranate M220 was loaded to the machine tanks directly from the original drum.

Moldings have been prepared using a steel mold selected in consideration of the cavity thickness (3 mm thick) and of the large planar surface. Prior to each PU-LFI pouring, the mold was prepared applying, on the upper half, an external mold release and, on the bottom half, a thin layer (approx 50 microns) of a polyurethane Internal Mold Release (IMR) in-mold paint provided by Sonnenborn & Rieck.

Three polyurethane formulations were evaluated, each trialed at two different content of chopped fiberglass (30 wt % and 40 wt %). During these trials the length of chopped glass fibers was set at 25 mm. The results relating to the formulations A-C are shown in the right half of the following the Table 1.

| | Hand-mix lab samples (Example 1) | | | | | | | | Krauss Maffei LFI (Example 2) | | | | | |
|---|---|---|---|---|---|---|---|---|---|---|---|---|---|---|
| | | | | | | | 7 (com- | | A | | B | | C | |
| Formulation (pbw) | 1 | 2 | 3 | 4 | 5 | 6 | parative) | 8 | A1 | A2 | B1 | B2 | C1 | C2 |
| Voranol CP 260 | 72.3 | 72.3 | 72.3 | 72.3 | 72.3 | 72.3 | 72.3 | 57.3 | 50.64 | | 50.64 | | 50.64 | |
| Tergitol L64E | 20.0 | 20.0 | 20.0 | 20.0 | 20.0 | 20.0 | 20.0 | 20.0 | 14.15 | | 14.15 | | 14.15 | |
| Glycerine | 6.0 | 6.0 | 6.0 | 6.0 | 6.0 | 6.0 | 6.0 | 6.0 | 4.2 | | 4.2 | | 4.2 | |
| NIAX L6900 | 1.0 | 1.0 | 1.0 | 1.0 | 1.0 | 1.0 | 1.0 | 1.0 | 0.7 | | 0.7 | | 0.7 | |
| Water | 0.0 | 0.0 | 0.0 | 0.0 | 0.0 | 0.0 | 0.0 | 0.0 | 0.2 | | 0.2 | | 0.2 | |
| Saytex RB 79 | 20.0 | 20.0 | 40.0 | 40.0 | 20.0 | 20.0 | 20.0 | 40.0 | 28.31 | | 28.31 | | 28.31 | |
| Levagard 4090N | | | | | | | | 15.0 | | | 10 | | | |
| Byk W 969 | | | | | | | | | 1 | | 1 | | 1 | |
| Exolit AP422 | | | | | 20.0 | | | | | | | | | |
| Exolit RP 6520 | | | | | | 20.0 | 20.0 | | | | | | 25 | |
| Aluminum Trihydrate | 100 | 150 | 100 | 150 | 80 | 80 | | 100 | 100 | | 100 | | 100 | |
| CaCO3 | | | | | | | 80 | | | | | | | |
| Polycat SA1/10 | 0.70 | 0.70 | 0.70 | 0.70 | 0.70 | 0.70 | 0.70 | 0.70 | | | | | | |
| Dabco KTM 60 | | | | | | | | | 2 | | 2 | | 2 | |
| Voranate M220 | 173 | 173 | 185 | 185 | 174 | 177 | 177 | 165 | 140 | | 148 | | 157 | |
| Isocyanate index (NCO/OH) | 110 | 110 | 110 | 110 | 110 | 110 | 110 | 110 | 110 | | 110 | | 110 | |
| Fiber glass content (wt % on the final composition) | 33 | 33 | 33 | 33 | 33 | 33 | 33 | 33 | 30 | 40 | 30 | 40 | 30 | 40 |
| Composite Density g/l | | 1.57 | | 1.58 | 1.67 | 1.61 | 1.63 | | | | | | | |
| Br wt % of the curable polyurethane resin | 3.06 | 3.06 | 5.54 | 5.54 | 2.87 | 2.87 | 2.87 | 5.90 | 5.4 | | 5.18 | | 4.88 | |
| P wt % of the curable polyurethane resin | 0 | 0.00 | 0.00 | 0.00 | 2.00 | 3.06 | 3.06 | 0.59 | 0 | | 0.49 | | 4.6 | |
| LOI | 34 | | 34 | 35 | 38 | 36 | 33 | 45 | 35 | 37 | 42 | | 48 | |
| Smoke density D4 (ASTM E662). flaming <200 (1) | | 90.5 | 69.0 | 257 | 364.0 | | 364 | | 83.5 | 82.4 | 314; 264 | | 170.4 | |
| Smoke density D4 (ASTM E662). non-flaming <200 (1) | | | | | | | | | 10.5 | 6.8 | 10 | | 7.9 | |

(1) in-mold painted samples tested on the naked side

The data illustrated in Table 1 confirm that formulations containing a high amount of brominated diol and ATH (samples A1 and A2) can concurrently meet the oxygen index and smoke density requirements (ASTM E662). The incorporation of phosphorous compounds significantly improves the oxygen index but worsens the smoke density. Nevertheless, sample C2 (with encapsulated red phosphorous) still met both requirements. Sample B2 (with Levagard 4090N) achieved excellent oxygen index value but did not meet the requirements for low smoke density (in the more severe flaming conditions). Samples A2 was also tested according to the European Technical Specification for Railways TS 45545-2 (for listed products IN1+IN4). Standard methods used for requirements of Hazard Level (HL) 1 (city-rails, trams) are ISO5658-2, and EN ISO 5659-2.

ISO 5658-2 determines the lateral flame spread on vertically oriented specimens (800 mm×155 mm×thickness) using a rectangular radiant panel and an additional gas burner flame as the ignition sources. The assessment is based on the CFE value. The CFE (Critical Heat Flux at Extinguishment, expressed in $kW/m^2$) is the incident heat flux at the specimen surface at the point where the flame ceases to advance and may subsequently go out. The CFE is determined by measuring the maximum spread of flame and relating this value to the corresponding heat flux value from the heat flux profile curve.

The EN ISO 5659-2 exposes a horizontal specimen to a cone furnace.

The test was carried out, as specified in TS45545-2, with a heat flux of 50 $kW/m^2$, without pilot flame. For smoke opacity the following parameters were measured and/or calculated: Ds(n)—Specific optical density of smoke: optical density in the test chamber multiplied by a factor, which depends on the instrument and on the specimen size; n indicates "at time n minutes into the test"; Ds is dimensionless
$VOF_4$—Cumulative value of specific optical densities in the first 4 min of the test. $VOF_4$ has dimensions of minutes. $VOF_4=[Ds(1)+Ds(2)+Ds(3)+Ds(4)]/2$ The same smoke chamber EN ISO 5659-2, with a heat flux of 50 $kW/m^2$, without pilot flame, was also used to determine the gas analysis using the FTIR technique and calculate the Conventional Index of Toxicity (CTI) according to CEN TS 45545-2, Annex C, Method 1.

The tested composite was found meeting the requirements for HL 1 applications according to the European Technical Specification for Railways (TS 45545-2) for listed products IN1+IN4.

TABLE 2

| Test method | Parameter Unit | Requirement for HL1 | Glass fiber 40 wt %; (Formulation A2) |
|---|---|---|---|
| ISO 5658-2 | CFE $kW/m2$ | Min 20 | 23.9 |
| EN ISO 5659-2: 50 kW/m2 w/o pilot flame | Ds (4) | Max 600 | 375 |
| EN ISO 5659-2: 50 kW/m2 w/o pilot flame | VOF4 minutes | Max 1200 | 570 |
| EN ISO 5659-2: 50 kW/m2 w/o pilot flame | CITG | Max 1.2 | 0.42 |

Example 3

Other trials, carried out using the formulation D (see the following Table 3), extended the investigation to the role of molded composite density and the type of chopped fiber on flammability behavior and mechanical properties. Fiber glass content was set to 35 wt %. Two different fiber glass lengths were evaluated: cut at 50 mm, and combination of half cut at 50 mm and half cut at 25 mm. Samples were characterized for mechanical and thermal properties; the results are illustrated in the following Table 4. Some samples (fiber glass 35 wt %, 25/50 mm) were tested for LOI and Smoke optical density in flaming conditions, on the non-painted surface.

TABLE 3

| Formulation (pbw) | Krauss Maffei LFI D |
|---|---|
| Voranol CP 260 | 50.44 |
| Tergitol L64E | 14.15 |
| Glycerine | 4.2 |
| NIAX L6900 | 0.7 |
| Water | 0.8 |
| Saytex RB 79 | 28.31 |
| Byk W 969 | 1 |
| Aluminum Trihydrate | 100 |
| Dabco KTM 60 | 2 |
| Total | 201.6 |
| Voranate M220 | 147 |
| Isocyanate index (NCO/OH) | 110 |
| Fiber glass content (wt % on the final composition) | 35 |

TABLE 4

| Sample | Total Glass fiber content wt % | Glass fiber 50 mm length %* | Glass fiber 25 mm length %* | Composite Density (g/l) | Flexural UNI EN ISO 178 Max Strength (MPa) | Flex. deflection (mm) | Modulus (MPa) | Tensile ISO 527-2 Max Strength (MPa) | Elongation at break (%) | Modulus (MPa) | Impact Charpy (kJ/m²) | Tg (°C.) | DMA 3 point bending Storgae modulus 100° C. (MPa) |
|---|---|---|---|---|---|---|---|---|---|---|---|---|---|
| 1 | 35 | 50 | 50 | 1565 | 298 | 6.03 | 10127 | 131 | 1.32 | 8888 | 72 | 144 | 6769 |
| 2 | 35 | 50 | 50 | 1538 | 200 | 6.68 | 8507 | 139 | 1.45 | 9254 | 99 | 148 | 7076 |
| 3 | 35 | 50 | 50 | 1657 | 262 | 6.4 | 10251 | 131 | 1.6 | 8674 | 88 | 155 | 6758 |
| 4 | 35 | 50 | 50 | 1701 | 283 | 6.8 | 10454 | 136 | 1.54 | 9122 | 97 | 155 | 5816 |
| 5 | 35 | 100 | — | 1559 | 278 | 5.9 | 10134 | 114 | 1.09 | 8652 | 84 | 156 | 8210 |

*relative % of the total glass fiber

As it can be seen from the data reported in the Table 4 above, all the samples showed excellent mechanical strength within the investigated ranges of molded density and fiber length, exceeding the requirements for interior applications typically set at 135 MPa and 70 MPa for Flexural Strength and Tensile Strength, respectively. Remarkably, the requirements for LOI and low smoke were retained, as shown by data reported in the following Table 5, which illustrates the results for LOI and smoke optical density of samples 1 to 4 of the Table 4 above.

TABLE 5

|  |  | Smoke optical density (flaming) ASTM E662 | | |
| --- | --- | --- | --- | --- |
|  | LOI | Ds (4) | VOF4 | Ds (max) | Ds (max corr) |
| Sample 1 | 35 | 143 | 157 | 345 | 333 |
| Sample 2 | 35 | 133 | 206 | 329 | 319 |
| Sample 3 | 36 | 136 | 180 | 373 | 363 |
| Sample 4 | >36 | 142 | 159 | 328 | 319 |

It can be therefore confirmed that the fiber-reinforced polyurethane composites of the present invention, made with the LFI fabrication process, and comprising the flame-resistant polyurethane-composite forming composition above defined, show a fire-reaction behaviour measured as Limiting Oxygen Index (LOI) greater than or equal to 35, tested according to GB/T 8924-2005 and a smoke production (Smoke density D4) lower or equal than 200, tested according to GB/T 8323-1987 (or to the equivalent ASTM E662).

Both requirements are also part of the specifications of the Chinese standard for rail interiors TB/T 3138-2006 (Appendix A, class "very hard to ignite") with particular reference for the intended applications to "Itemization of material for ceiling panels, side wall and air duct (Table 4) acc. Section 3.1"; the specification items thereof also comprising burning at 45° angle.

Further, it has been found that the fiber-reinforced polyurethane composites according to the present invention meet also the European Technical Specification for Railways TS 45545-2.

The invention claimed is:

1. A flame-resistant polyurethane-composite forming composition comprising a curable polyurethane resin, a filler and a fiber, the resin comprising an isocyanate-reactive composition and an isocyanate composition, wherein
   a) the isocyanate-reactive composition comprises:
      a polyol component comprising at least one polyether polyol having a nominal functionality of at least 2 and a molecular weight of 150 to 1,000, in an amount of at least 10% by weight of the curable polyurethane resin, the polyether polyol having at least three hydroxyls, primary amino and/or secondary amino groups per molecule and showing an equivalent weight from 50 to 150; and
      at least one isocyanate-reactive brominated compound, in an amount of at least 6% by weight of the curable polyurethane resin;
   b) the isocyanate composition comprises a polyisocyanate component comprising at least one methane diphenyldiisocyanate (MDI) and/or polymeric MDI, having a nominal functionality of at least 2, in an amount of at least 20% by weight of the curable polyurethane resin;
   c) the filler comprising at least one metal hydrate particulate filler selected from Al(OH)$_3$, Mg(OH)$_2$ and hydromagnesite, in an amount of at least 10% by weight of the flame-resistant polyurethane-composite forming composition; and
   d) the fiber being selected from glass fiber, carbon fiber, boron fiber, and high-melting polymeric fibers-, in an amount of at least 20% by weight of the flame-resistant polyurethane-composite forming composition.

2. A flame-resistant polyurethane-composite forming composition comprising a curable polyurethane resin, a filler and a fiber, the resin comprising an isocyanate-reactive composition and an isocyanate composition, wherein
   a) the isocyanate-reactive composition comprises:
      a polyol component comprising at least one polyether polyol having a nominal functionality of at least 2 and a molecular weight of 150 to 1,000, in an amount of at least 10% by weight of the curable polyurethane resin, the polyether polyol being selected from the group consisting of ethoxylates and propoxylates of glycerine, ethoxylates and propoxylates of trimethylolpropane having an equivalent weight of up to 120; and
      at least one isocyanate-reactive brominated compound, in an amount of at least 6% by weight of the curable polyurethane resin;
   b) the isocyanate composition comprises a polyisocyanate component comprising at least one methane diphenyldiisocyanate (MDI) and/or polymeric MDI, having a nominal functionality of at least 2, in an amount of at least 20% by weight of the curable polyurethane resin;
   c) the filler comprising at least one metal hydrate particulate filler selected from Al(OH)$_3$, Mg(OH)$_2$ and hydromagnesite, in an amount of at least 10% by weight of the flame-resistant polyurethane-composite forming composition; and
   d) the fiber being selected from glass fiber, carbon fiber, boron fiber, and high-melting polymeric fibers-, in an amount of at least 20% by weight of the flame-resistant polyurethane-composite forming composition.

3. The composition according to claim 1 wherein the polyol component further comprises a higher molecular weight polyol having an equivalent weight of from 161 up to 2000.

4. The composition according to claim 1 wherein the isocyanate-reactive brominated compound is selected from the group of aromatic or aliphatic brominated alcohols, diols or triols.

5. The composition according any of the previous claims, to claim 1 wherein the isocyanate-reactive brominated compound is selected from the group of tetrabromophtalic anhydride diols, dibromoneopentyl glycol, tribromoneopentylalcohol, halogenated aliphatic polyethers diols and triols.

6. The composition according to claim 1 wherein the isocyanate-reactive brominated compound is a tetrabromophtalic anhydride diol.

7. The composition according to to claim 1 wherein the filler comprises the at least one metal hydrate particulate filler and further comprises at least one of calcium carbonate, huntite, talc, wollastonite, clay, ground glass, carbon black, titanium dioxide, and iron oxide.

8. The composition according to claim 1 wherein the filler further comprises calcium carbonate.

9. The composition according to claim 1 wherein the fiber is chopped glass fiber having a length between 12.5 mm and 100 mm.

10. The composition according to claim 1 wherein the fiber is a fiber glass mat.

11. The composition according to claim 1 wherein the fiber comprises a fiber glass continuous roving.

12. The composition according to claim 1 wherein the fiber content is at least 30% of the total weight of the flame-resistant polyurethane-composite forming composition.

13. The composition according to claim 1, further comprising at least one phosphorous-based compound selected from the group consisting of isocyanate-reactive compounds and non-fugitive additives.

14. The composition according to claim 13 wherein the phosphorous-based compound is selected from the group of hydroxylated phosphates, hydroxylated phosphonates, liquid phosphorous-based additive having a vapor pressure at 65° C. below 900 Pa, solid phosphorous-containing compound as ammonium polyphosphates, and red phosphorous.

15. The composition according to claim 13, wherein the phosphorous-based compound is selected from the group of N,N-bis-(2-hydroxylethyl) aminomethane phosphonic acid diethyl ester, ammonium polyphosphates and encapsulated red phosphorous.

16. The composition according to claim 13 wherein the phosphorous-based compound is in an amount, expressed as the content of elemental phosphorous, of less than 8 wt %, based on the curable polyurethane resin.

17. A combustion-modified, fiber-reinforced polyurethane composite comprising the flame-resistant polyurethane-composite forming composition according to claim 1, wherein the composite shows a fire-reaction behaviour measured as Limiting Oxygen Index (LOI)≥35, tested according to GB/T 8924-2005 and a smoke production lower than 200, tested according to GB/T 8323-1987 or ASTM E662.

18. A long-fiber injection molding process for the preparation of a combustion-modified, fiber-reinforced polyurethane composite, comprising applying a fiber-reinforced layer, dispensing the flame-resistant polyurethane-composite forming composition according to claim 1 over an open mold, then closing the mold so to shape and consolidate under pressure the composite, demolding and then trimming the resulting composite.

19. A process according to the previous claim, comprising, before applying the fiber-reinforced layer according to claim 18, the following steps:
(i) applying an external mold release and/or a surface enhancement layer selected from the group consisting of in-mold coatings and decorative foils;
(ii) applying a non-reinforced polyurethane barrier layer to reduce fiber read-through according to a process of sprayed polyurethane barrier layer or poured polyurethane barrier layer.

\* \* \* \* \*